United States Patent [19]

Hauff

[11] 4,174,126
[45] Nov. 13, 1979

[54] WALL FEEDTHROUGH FITTING

[76] Inventor: Werner Hauff, In den Stegwiesen 18, Herbrechtingen, Fed. Rep. of Germany

[21] Appl. No.: 884,806

[22] Filed: Mar. 9, 1978

Related U.S. Application Data

[63] Continuation-in-part of Ser. No. 737,027, Oct. 19, 1976, Pat. No. 4,078,834.

[30] Foreign Application Priority Data

Oct. 31, 1975 [DE] Fed. Rep. of Germany ....... 2548807
Apr. 22, 1977 [DE] Fed. Rep. of Germany ....... 2717951

[51] Int. Cl.² ............................................. F16L 5/00
[52] U.S. Cl. ................................... 285/158; 285/348; 285/353; 285/356
[58] Field of Search ................. 285/233, 234, 223, 49, 285/353, 354, 356, 231, 331, 357, 348, 158, 346, 192, 374

[56] References Cited

U.S. PATENT DOCUMENTS

| 503,433 | 8/1893 | McIntyre | 285/357 |
| 1,138,946 | 5/1915 | Elliott | 285/357 X |
| 1,538,395 | 5/1925 | Gone | 285/357 X |
| 2,560,263 | 7/1951 | Wiegand et al. | 285/348 X |
| 2,941,025 | 6/1960 | Wayman | 285/348 X |
| 2,958,548 | 11/1960 | DeVienne et al. | 285/356 X |
| 3,055,972 | 9/1962 | Peterson | 285/356 X |

FOREIGN PATENT DOCUMENTS

290526 5/1928 United Kingdom ...................... 285/357

*Primary Examiner*—Dave W. Arola
*Attorney, Agent, or Firm*—Karl F. Ross

[57] ABSTRACT

A wall feedthrough fitting comprises a feedthrough tube that is embedded in a wall and has a pair of opposite ends each exposed to the respective face of the wall. An annular seal surrounds this tube adjacent one of the ends and radially inwardly bears on the tube and radially outwardly bears on a holding ring embedded in the wall and spacedly surrounding the tube. This holding ring extends axially toward one end of the tube beyond the seal and has between the seal and this one end an internal screwthread. A pressure ring is threaded into this holding ring and may bear directly via an axial face or indirectly via an intermediate ring on the seal. The tube may be provided at its one end with an external thread that engages a complementary thread inside the pressure ring.

10 Claims, 5 Drawing Figures

WALL FEEDTHROUGH FITTING

CROSS REFERENCE TO RELATED APPLICATION

This application is a continuation-in-part of my copending application Ser. No. 737 027 filed Oct. 19, 1976 (now U.S. Pat. No. 4,078,834), the entire disclosure of which is herewith incorporated by reference.

FIELD OF THE INVENTION

The present invention relates to a wall feedthrough fitting. More particularly this invention concerns a fitting which is cast into or subsequently fitted through a wall so that electrical wires, pipes, and the like can pass through the wall at the fitting.

BACKGROUND OF THE INVENTION

In the above-cited patent application there is disclosed a wall duct assembly comprising a duct having on its outer surface retaining grooves in which are provided seals. These seals can be axially compressed so that when the unit is cast into a wall axial compression of the seals forces them radially outwardly against the wall, radially inwardly against the tube, and axially in one direction also against the wall, thereby forming an excellent seal.

Such an arrangement has, however, the disadvantage that two seals must be used, so that the construction costs are somewhat elevated. Furthermore the device is frequently fouled when the cable, pipe, or the like is passed through the duct, as the inner surface of the seal is exposed when the cover or end piece for the unit has been removed.

OBJECTS OF THE INVENTION

It is therefore an object of the present invention to provide an improved wall feedthrough fitting.

Another object is to advance the principles set forth in the above-mentioned copending application and improve thereon.

A further object is to provide such a wall feedthrough fitting which is relatively simple to manufacture so that it can be produced at relatively low cost, and which forms an excellent tight seal.

Finally an object of the instant invention is to provide a wall fitting where the compressible seal part is protected from fouling when the end cap has been removed.

SUMMARY OF THE INVENTION

These objects are attained according to the present invention in a wall feedthrough fitting wherein an annular seal surrounds a feedthrough tube whose opposite axial ends are each exposed at a respective face of a wall in which the tube is embedded. A holding ring surrounds the tube at the seal and radially engages the seal. This holding ring extends axially in one direction beyond the seal toward one end of the feedthrough tube and has between the seal and this one end an internal screwthread. A pressure ring is provided between the holding ring and the tube, and is threaded into the screwthread of the holding ring so that it can bear axially in the opposite axial direction on the seal. Thus screwing of the pressure ring into the holding ring presses the seal axially in this opposite axial direction.

With the fitting according to the instant invention the seal ring itself is not exposed radially inwardly. Thus the insertion of cable, pipe, or the like through the fitting will not foul the seal. What is more, the single seal ring serves for a complete sealing of the fitting with respect to the wall around.

According to this invention the pressure ring which is threaded into the holding ring may itself bear directly axially on the seal. This can advantageously be accomplished by forming the one end of the tube of the fitting with an external thread that meshes with the corresponding and complementary thread on the pressure ring. This particular arrangement has considerable advantages during installation of the fitting, in particular when cast into a wall. The one-piece pressure ring is screwed into place so as to lock the relative positions of the holding ring, the seal, and the feedthrough tube. Tightening of the pressure ring after the wall is hardened around the unit tightens the seal as described above. It is also possible after hardening of the wall around the unit to withdraw the one-piece pressure ring and replace it with various other units.

This last-mentioned possibility is particularly advantageous when the user desires to provide an extension or nipple on one side of the fitting. This extension can be constituted as a tube or intermediate ring which has one axial face directed in one axial direction and bearing directly on the pressure ring and another axial face directed in the opposite direction and bearing on the seal. To this end the pressure ring is substantially of L-section and has one L-leg extending axially and formed with an external screwthread engaging the internal screwthread and another L-leg projecting radially inwardly from the one L-leg and bearing directly axially in the opposite direction on the intermediate ring. This intermediate ring may have a tubular portion extending axially in the one direction. The advantage of such an arrangement is the intermediate ring need not be rotated to tighten the seal, instead the pressure ring is rotated to press the intermediate ring into tight contact with the seal, so that in effect the seal is formed with this intermediate ring. Nonetheless the offset inner portion of the intermediate ring ensures that cables, pipes, or the like passed through it will not come into direct contact with the seal and dirty it.

The feedthrough tube may in accordance with another feature of this invention be constituted as the insulating lining sleeve surrounding a ground connector as described in the above-cited copending application. Thus fitted within this insulating feedthrough sleeve is a bar of conductive material having its ends exposed at the opposite faces of the walls and each formed with a blind bore. Terminal screws threadable into this blind bore allow an electrical connection to be made through the wall, with virtually no possibility of leakage through the wall at the connection.

SPECIFIC DESCRIPTION

Figure 1:
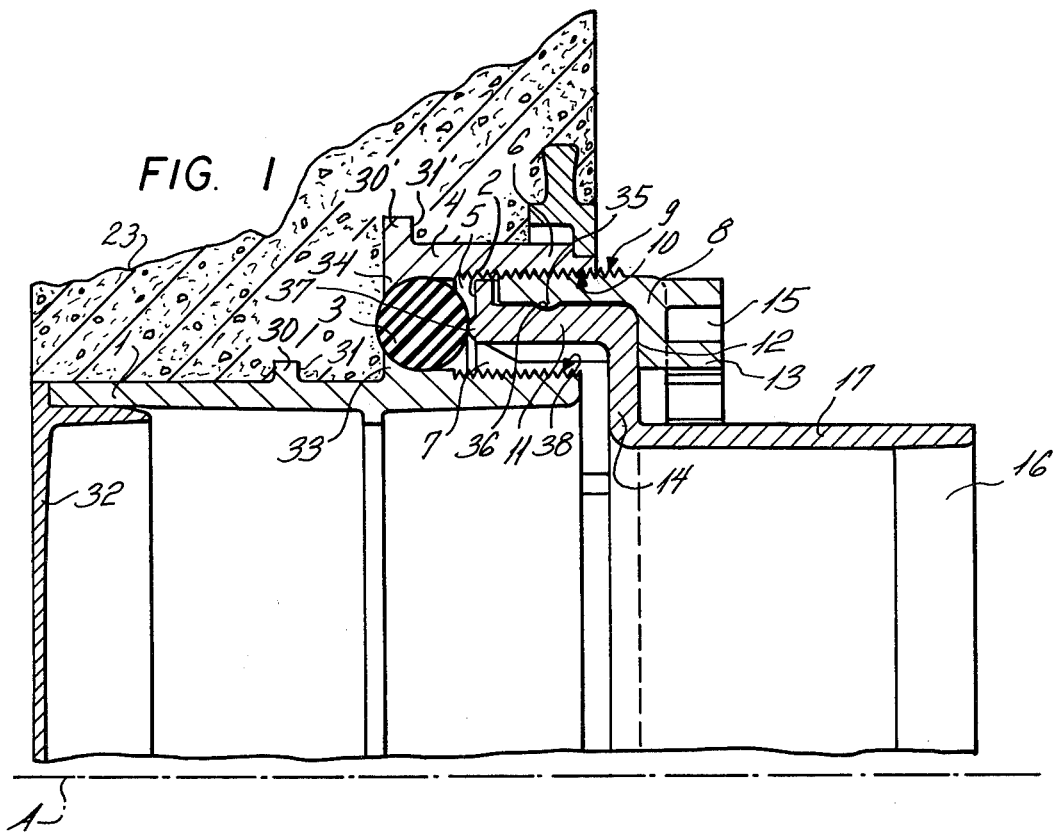
FIG. 1 is an axial partial section through a fitting according to this invention.

As shown in FIG. 1 a feedthrough tube 1 centered on an axis A is formed with an annular outwardly concave seat 33 receiving an elastomeric O-ring 3 dimensioned to snugly radially inwardly bear on the tube 1 at the seat 33. Radially outside the tube 1 is provided a holding ring 4 formed with an inwardly concave seat 34 against which the seal 3 bears radially outwardly. The tube 1 and holding ring 4 are both made of a metal and are separate pieces movable relative to each other both radially and axially. A space 5 open axially in both directions is defined between the tube 1 and holding ring 4. Furthermore the ring 4 has an axial extension or collar 6 formed with an internal screwthread 10. An L-section pressure ring 8 has an axially extending leg formed with an external thread 9 that engages the thread 10 and a radially inwardly extending leg 13 forming an axial pusher face 12 and also formed with recesses 15 adapted to be engaged by a wrench.

Between the pressure ring 8 and the tube 1 there is formed a space 7 in which is received an intermediate or pusher ring 11 forming a pusher surface 2 bearing axially on the portion of the seal 3 exposed in the space 5 between the ring 4 and the fitting 1. This intermediate ring 11 has a radially inwardly extending flange 14 that bears axially on the face 12 of the leg 13 of the pressure ring 8. The pressure ring 8 is formed with a radially inwardly projecting ridge 35 engaging in a radially outwardly open annular recess 36 formed in the intermediate ring 11 so that the two parts 8 and 11 are axially linked together but relatively rotatable and forcibly separable. In addition the face or shoulder 2 of the intermediate ring 11 has an axially projecting bump 37 that axially bears on the seal 3.

Figure 3:
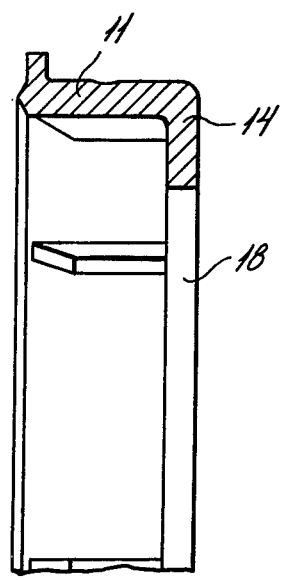
FIGS. 3 and 4 are axial partial sections through intermediate rings according to the instant invention.
Figure 4:
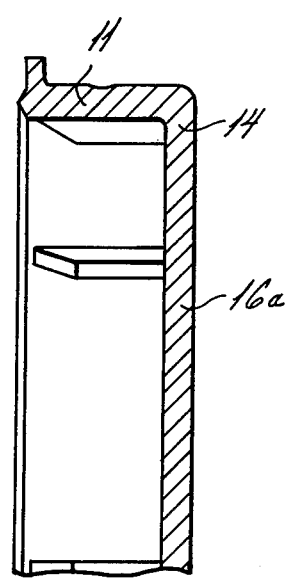

The intermediate ring 11 having the flange 14 is actually merely the end part of an extension tube 17 having an end 16 adapted to fit a conduit or the like. This end 16 may be formed with several holes dimensioned to receive respective pipes, conduits, or wires. It is also possible to merely terminate the flange 14 as shown in FIG. 3 to leave a large-diameter throughgoing hole 18. Furthermore as shown in FIG. 4 the flange 14 can be extended across to form a closed end 16a that may be drilled after installation as desired, or simply used to close off the fitting if not needed or until needed.

Figure 2:
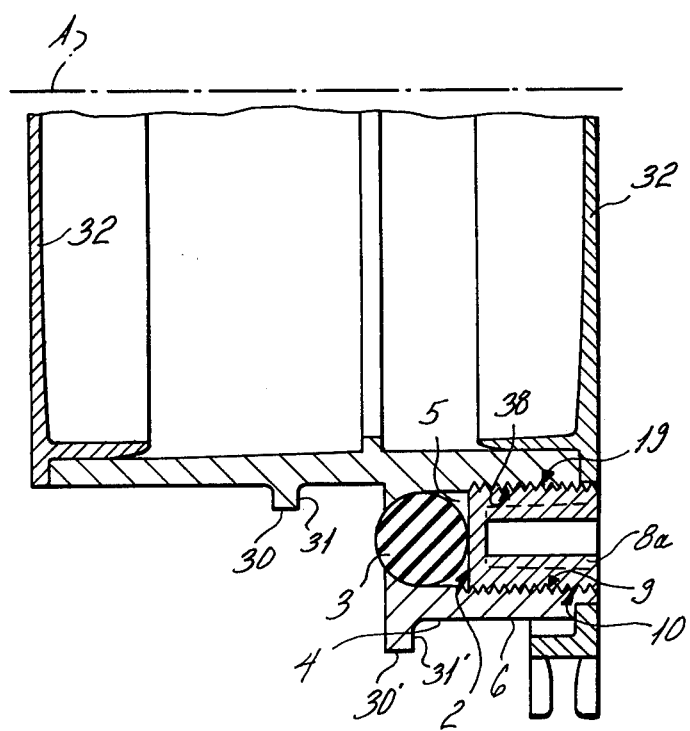
FIG. 2 is a similar section through another fitting in accordance with the present invention.

With the arrangement of the instant invention it is possible to install the device to start with by providing a cap 32 at each end, and by employing a one-piece pressure ring 8a having an internal thread 19 matching an external thread 38 as shown in FIG. 2. This one-piece pressure ring 8a therefore has on its outer periphery the screwthread 9 and on its inner periphery the screwthread 19, both of identical hand and pitch. The ring 8a is screwed into the assembly to hold it in the proper position during casting of a wall around the device, with the caps 32 preventing entry of the casting material, normally concrete, into the fitting. Once the concrete is hardened the one-piece ring 8a is withdrawn and can be replaced with the arrangement shown in FIG. 1.

After installation rotation of the ring 8 or 8a by fitting an appropriate tool into the recess 15 will force the shoulder surface 2 axially against the seal 3 and thereby press it into excellent contact with the seats 33 and 34 and also into contact with the concrete of the wall exposed between these seats 33 and 34. Counter shoulders 31 and 31' formed by flanges 30 and 30' on the tube 1 and ring 4, respectively, prevent axial shifting of these parts within the wall once it has hardened and cured.

Figure 5:
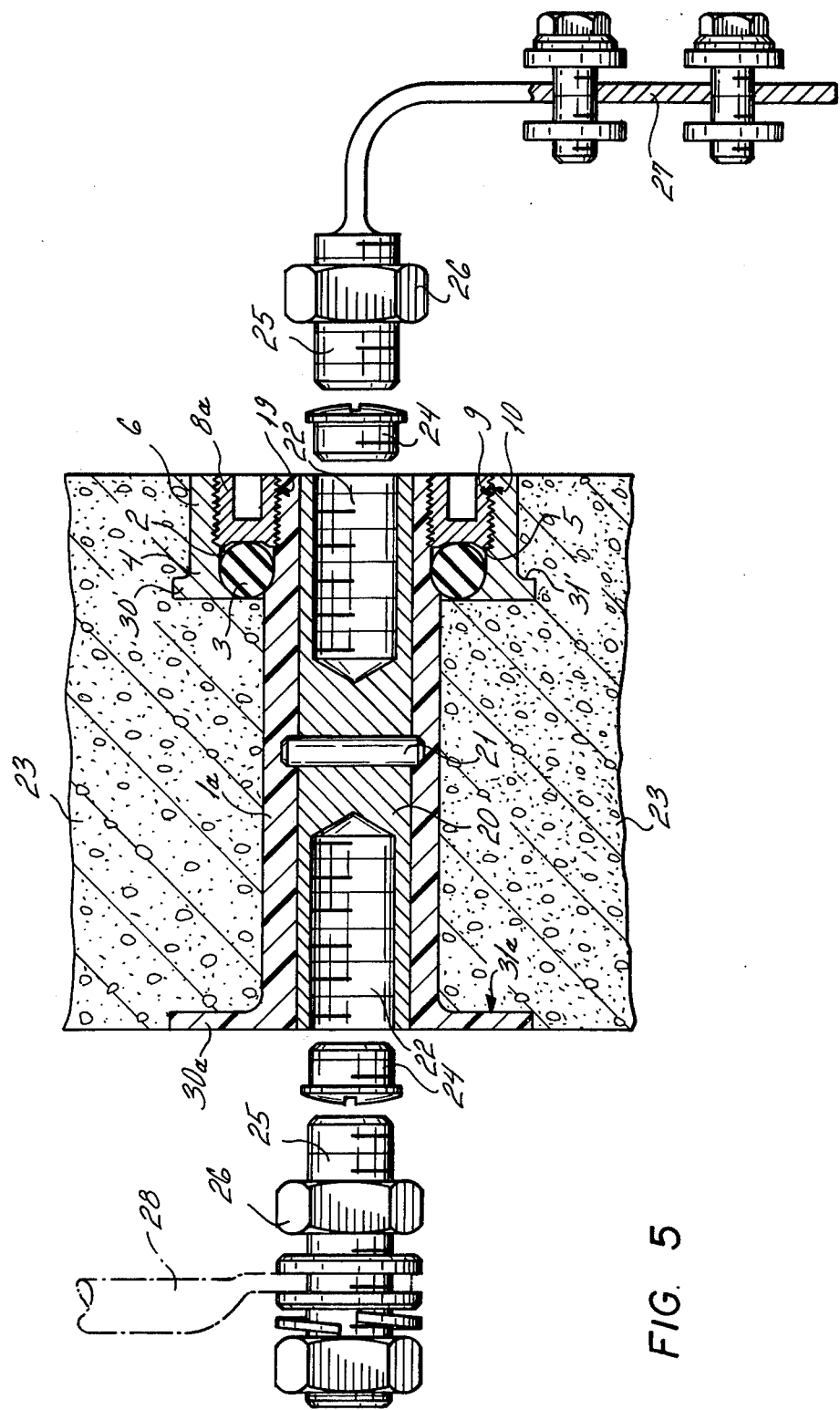
FIG. 5 is an axial section through a completely installed fitting in accordance with the present invention.

FIG. 5 shows how a tube 1a of insulating material may receive internally a metal bar 20 secured in place by a transverse pin 21 and having its opposite ends formed with threaded blind bores 22 as described in the above-cited application. This arrangement is embedded in a wall 23 with the flanges 30a forming the counter shoulder 31a at one face of the wall and the seal arrangement at the opposite face. During casting of the wall plugs 24 are screwed into the bores 22 to prevent concrete or the like from entering them, but after installation terminal screws 25 having locknuts 26 can be screwed into these bores 22 to form the electrical connection through the wall 23. The one terminal screw 25 may have an extension 27 that is connected to a ground rod, and the other screw 25 may be connected to an eye 28 on the end of a ground cable.

At its end opposite the flange 30a there is provided a holding ring 4, seal 3, and pressure ring 8a identical to those described in FIG. 2. In this arrangement after installation the one-piece pressure ring 8a need merely be screwed in somewhat tighter on the threads 38 and 10 of the tube 1a and holding ring 4 as described above to increase the sealing effect.

With the system according to the instant invention the single seal 3 ensures that no leakage around the tube 1 will be possible. This ring 3 can be tightened after installation of the assembly, but at the same time is not exposed inside the tube 1 so that fouling of this seal 3 during insertion of cables, pipes, or the like through the tube 1 is almost impossible.

I claim:

1. A feedthrough-fitting assembly comprising:
   a wall having a pair of faces;
   a feedthrough tube extending along a tube axis and having a pair of opposite axial ends, said tube being imbedded in said wall with its said ends each exposed at a respective one of said faces of said wall;
   an annular seal surrounding said tube adjacent one of said ends thereof and radially inwardly engaging said tube, said seal bearing axially against said wall;
   a holding ring surrounding said tube at said seal and radially engaging same, said holding ring being fixedly imbedded in said wall and being independent of and spaced radially outwardly from said tube, said holding ring extending axially in one direction beyond said seal toward said one end and having between said seal and said one end an internal screwthread; and
   a pressure ring between said holding ring and said tube, threaded into said screwthread of said holding ring, and bearing axially in the opposite direction on said seal, whereby screwing of said pressure ring into said holding ring presses said seal axially in said opposite direction against said wall and deforming said seal radially inwardly and outwardly against said tube and holding ring.

2. The assembly defined in claim 1 wherein said pressure ring has an annular face directed axially in said opposite direction and directly engaging said seal.

3. The assembly defined in claim 2 wherein said tube is formed at said one end with an external screwthread and said ring is also threaded thereinto.

4. The assembly defined in claim 3 wherein both of said screwthreads are of the same pitch and hand.

5. The assembly defined in claim 1, further comprising an intermediate ring having one axial face directed in said one direction and bearing directly on said pressure ring and another axial face directed in said opposite direction and bearing directly on said seal.

6. The assembly defined in claim 5 wherein said pressure ring is substantially of L-section and has one L-leg extending axially and formed with an external screwthread engaging said internal screwthread and another L-leg projecting radially inwardly from said one L-leg and bearing directly axially in said opposite direction on said intermediate ring.

7. The assembly defined in claim 6 wherein said intermediate ring is provided with a tubular portion extending axially in said one direction.

8. The assembly defined in claim 6 wherein said intermediate ring has a radially inwardly projecting flange forming said one axial face and bearing directly on said other L-leg of said pressure ring.

9. The assembly defined in claim 1 further comprising a formation forming a radially outwardly extending shoulder having an annular face directed in said one direction on said tube between said seal and said other end of said tube and imbedded in said wall.

10. The assembly defined in claim 1, further comprising a formation forming a radially outwardly extending shoulder having an annular face directed in said one direction on said holding ring.

* * * * *